United States Patent
Teng et al.

(10) Patent No.: US 11,292,056 B2
(45) Date of Patent: Apr. 5, 2022

(54) COLD-SPRAY NOZZLE

(71) Applicant: DIVERGENT TECHNOLOGIES, INC., Los Angeles, CA (US)

(72) Inventors: Alexander Pai-chung Teng, Lomita, CA (US); John Russell Bucknell, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 569 days.

(21) Appl. No.: 16/029,418

(22) Filed: Jul. 6, 2018

(65) Prior Publication Data

US 2020/0009657 A1    Jan. 9, 2020

(51) Int. Cl.
| | |
|---|---|
| *B22F 3/115* | (2006.01) |
| *B33Y 30/00* | (2015.01) |
| *C23C 4/18* | (2006.01) |
| *B22D 23/00* | (2006.01) |
| *C23C 4/123* | (2016.01) |
| *B33Y 10/00* | (2015.01) |

(52) U.S. Cl.
CPC .......... *B22F 3/115* (2013.01); *B22D 23/003* (2013.01); *B33Y 10/00* (2014.12); *B33Y 30/00* (2014.12); *C23C 4/123* (2016.01); *C23C 4/185* (2013.01)

(58) Field of Classification Search
CPC ................................ B22F 3/115; B33Y 10/00
See application file for complete search history.

(56) References Cited

U.S. PATENT DOCUMENTS

| | | | |
|---|---|---|---|
| 2,982,089 A | | 5/1961 | Egbert |
| 3,146,669 A | * | 9/1964 | Wolf ................. F02K 9/976 89/1.816 |
| 5,203,226 A | | 4/1993 | Hongou et al. |
| 5,742,385 A | | 4/1998 | Champa |
| 5,975,493 A | | 11/1999 | Ellingson et al. |
| 5,990,444 A | | 11/1999 | Costin |
| 6,010,155 A | | 1/2000 | Rinehart |
| 6,046,426 A | | 4/2000 | Jeantette et al. |
| 6,096,249 A | | 8/2000 | Yamaguchi |
| 6,140,602 A | | 10/2000 | Costin |

(Continued)

FOREIGN PATENT DOCUMENTS

| | | |
|---|---|---|
| DE | 102016012348 A1 | 4/2018 |
| WO | 1996036455 A1 | 11/1996 |

(Continued)

OTHER PUBLICATIONS

US 9,202,136 B2, 12/2015, Schmidt et al. (withdrawn)

(Continued)

*Primary Examiner* — Nicholas R Krasnow
(74) *Attorney, Agent, or Firm* — Arent Fox LLP

(57) ABSTRACT

Systems, apparatus, and method for manufacturing are disclosed. In an aspect, the apparatus may be a cold-spray nozzle. The cold-spray nozzle may include a variable diameter convergent part. The cold-spray nozzle may also include a variable diameter divergent part. The variable diameter divergent part may form a diffuser. Additionally, The cold-spray nozzle may include a ring portion. The ring portion may couple the variable diameter convergent part and the variable diameter divergent part. Additionally, the ring portion may control the opening to the diffuser.

3 Claims, 7 Drawing Sheets

(56) References Cited

U.S. PATENT DOCUMENTS

| | | |
|---|---|---|
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 6,935,096 B2 | 8/2005 | Haiun |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,103,503 B2 | 8/2015 | Odenthal et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |

(56) References Cited

U.S. PATENT DOCUMENTS

| | | |
|---|---|---|
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |

(56) References Cited

U.S. PATENT DOCUMENTS

| | | |
|---|---|---|
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2004/0065502 A1 | 4/2004 | Yamamoto |
| 2006/0108783 A1 | 5/2006 | Ni et al. |
| 2012/0096769 A1 | 4/2012 | Tyll |
| 2014/0277669 A1 | 9/2014 | Nardi et al. |
| 2016/0319678 A1 | 11/2016 | Staroselsky et al. |
| 2017/0113344 A1 | 4/2017 | Schönberg |
| 2017/0341309 A1 | 11/2017 | Piepenbrock et al. |
| 2017/0355018 A1* | 12/2017 | Karlen .................. B22F 3/16 |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
https://www.sciencedirect.com/science/article/pii/S0257897211007535#f0005 (Year: 2011).*
International Search Report & Written Opinion received in PCT/US2019/040344 dated Sep. 30, 2019.
Supplementary European Search Report issued for corresponding application No. EP 19830834.8, dated Dec. 8, 2021, 9 pages.

* cited by examiner

COLD-SPRAY NOZZLE

BACKGROUND

Field

The present disclosure relates generally to manufacturing techniques, and more specifically 3-D-printing methods using spray forming and particularly to nozzles for 3-D-printing methods using cold-spray processes.

Background

Key technological developments and advances in manufacturing have been made in recent years with the increasingly widespread use of three dimensional (3-D) printing for a variety of applications. Such applications are especially prevalent in the context of manufacturing numerous types of sophisticated mechanical structures. Similar advances have recently been made, and milestones achieved, relative to the advancement of 3-D printing technologies themselves. The plethora of modern 3-D printing techniques that have been the subject of such recent advances include, for example, stereolithography (SLA), digital light processing (DLP), fused deposition modeling (FDM), selective laser sintering (SLS), selective laser melting (SLM), and the like.

One example of 3-D printing may use cold-spray forming as part of a manufacturing process of components. Spray forming may direct a solid phase powder material into a base material at high speed. Cold-spray forming may generally be an additive manufacturing process by spraying one or more materials to form a manufactured article. With the cold-spray manufacturing process, a material being deposited may be kept below the material's melting point. The material being deposited may be sprayed at a base material at a speed high enough to induce solid-state welding on impact. The material may be sprayed using a nozzle, e.g., a cold-spray nozzle. Cold-spray may be used to deposit a metal (or metal alloy, plastics, ceramics, or mixtures thereof) structure to join, for example, a number of off-the-shelf parts or manufactured parts such as extruded parts, 3-D printed parts, cold-spray 3-D printed parts or other manufactured parts.

Conventional cold-spray nozzles have fixed opening profiles. Accordingly, when different size cold-spray nozzles are needed for a particular spray pattern for the solid powder material, the cold-spray process will need to be stopped so that one nozzle may be changed for another nozzle. Stopping the cold-spray process to change nozzles may slow down the manufacturing of parts.

SUMMARY

Several aspects of methods will be described more fully hereinafter with reference to three-dimensional (3-D) printing techniques. One aspect relates to manufacturing techniques that include 3-D-printing methods using spray forming and more particularly to nozzles for cold-spray processes.

Systems, apparatus, and method for manufacturing a structure are disclosed. An apparatus may be a cold-spray nozzle. The cold-spray nozzle includes a variable diameter convergent part. Additionally, the cold-spray nozzle includes a variable diameter divergent part forming a diffuser. The cold-spray nozzle also includes a ring portion coupling the variable diameter convergent part and the variable diameter divergent part and controlling the opening to the diffuser.

An apparatus may be a cold-spray device. The cold-spray device includes a material hopper. Additionally, the cold-spray device includes a pressurized gas feed coupled to the material hopper. The cold-spray device also includes a cold-spray nozzle coupled to the pressurized gas feed and configured to receive material from the material hopper. The cold-spray nozzle includes a variable diameter convergent part. Additionally, the cold-spray nozzle includes a variable diameter divergent part forming a diffuser. The cold-spray nozzle also includes a ring portion coupling the variable diameter convergent part and the variable diameter divergent part and controlling the opening to the diffuser.

A method of cold-spray forming a part includes cold-spraying at least a first portion of a first layer of the part. Additionally, the method of cold-spray forming includes adjusting a variable diameter convergent part and a variable diameter divergent part in a nozzle including the variable diameter convergent part and the variable diameter divergent part forming a diffuser and a ring portion coupling the variable diameter convergent part and the variable diameter divergent part. The method of cold-spray forming also includes cold-spraying at least a second portion of a second layer of the part using the adjusted variable diameter convergent part and the adjusted variable diameter divergent part and controlling the opening to the diffuser.

It will be understood that other aspects of 3-D printing using spray forming will become readily apparent to those skilled in the art from the following detailed description, wherein it is shown and described only several embodiments by way of illustration. As will be realized by those skilled in the art, the manufactured structures and the methods for manufacturing these structures are capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of 3-D printing using spray forming to manufacture, and more particular, to nozzles for such manufacturing will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of 3-D printing using spray forming to manufacture and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Figure 1B:
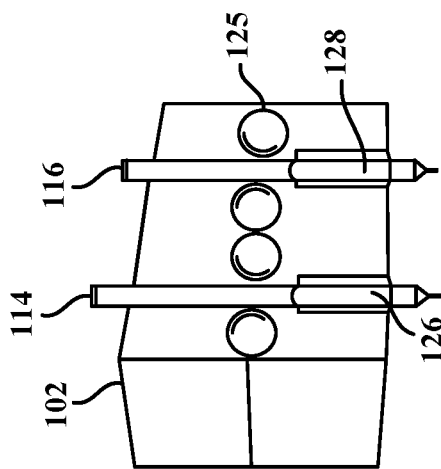
FIGS. 1A-B illustrate a diagram of a 3-D printer using fused deposition modeling (FDM).
Figure 1A:
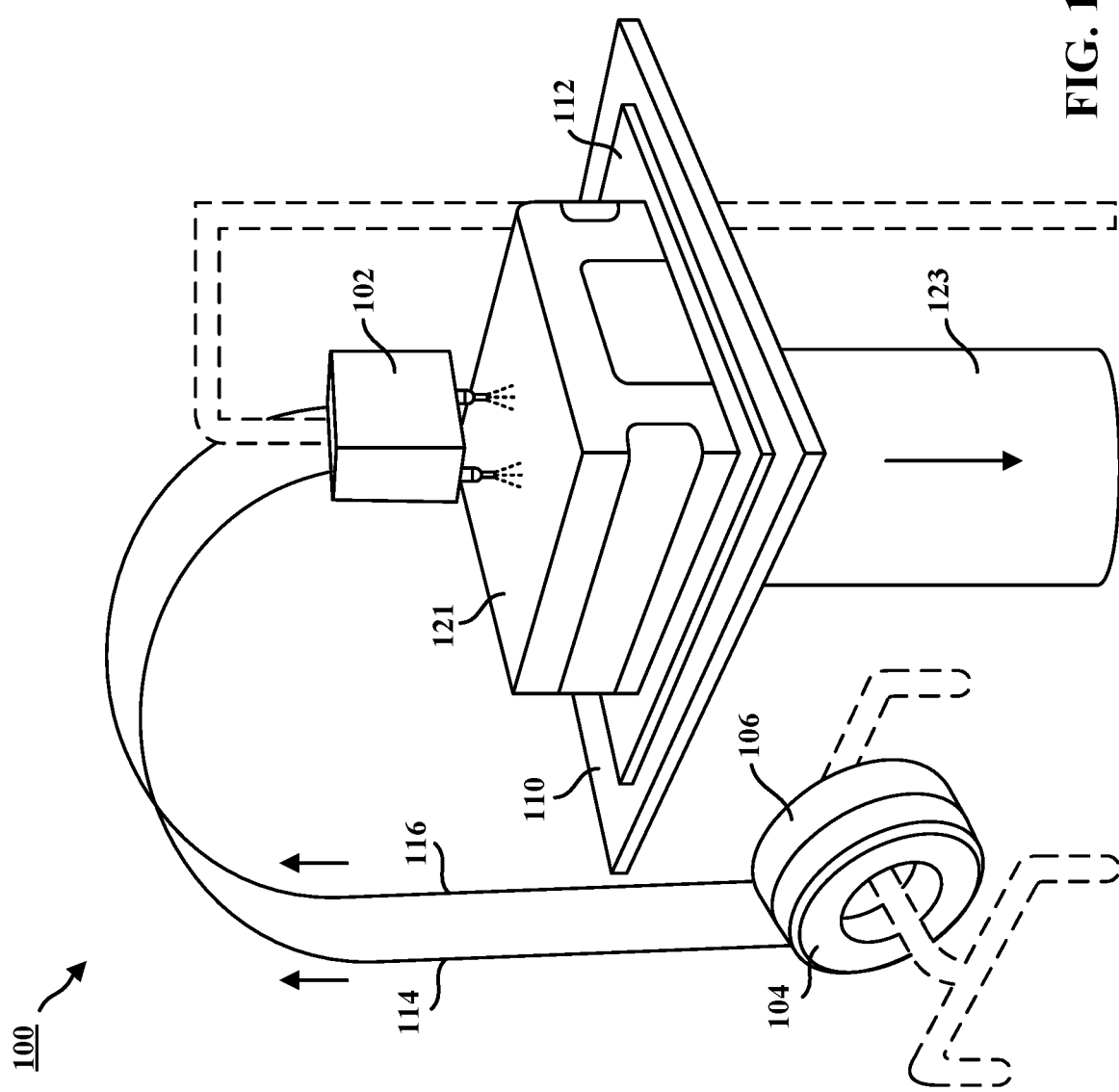

FIGS. 1A-B illustrate a diagram of a 3-D printer that may use fused deposition modeling (FDM). FDM is an additive manufacturing technique wherein a thermoplastic or other material, e.g., metal, may be extruded through a temperature-controlled print nozzle 102. The print nozzle 102 can be moved in both horizontal and vertical directions by a mechanical device that is under the control of a computer-aided manufacturing (CAM) software package. The 3-D part to be constructed is built one layer at a time, and the layers successively overlap each other in a prescribed manner to manufacture a part 121.

The 3-D printer of FIG. 1A also includes a first spool 104 for providing a first material 106 that is fed to the extrusion head 102 and a second spool for providing a second material that is fed to the extrusion head 102. While in some configurations the material 114 may constitute a build material for forming the successive layers of the part and the material 116 a support material for providing temporary support to accommodate spatial vacancies created by the predetermined shapes of certain structures whose shape may otherwise be compromised by gravity prior to solidifying, the 3-D printing techniques contemplated in this disclosure may obviate the need for a support material by using complex matrix arrays as backing structures.

3-D printer 100 may also include a substrate or base 112 upon which the printing may occur, and a vertically movable build platform 110. During the 3-D printing process wherein the material 114 is extruded onto a surface of part 121 to manufacture successive layers, the build platform 110 may be configured under software control to gradually move lower in the vertical direction (as indicated by the arrow on support arm 123) to accommodate the space occupied by the increasing number of layers of part 121.

FIG. 1B shows an expanded view of extrusion head 102. Materials 114 and 116 may be fed using rotating drive wheels 125 into extrusion nozzles 126 and 128, respectively. The materials 114 and 116 are melted by the application of heat in respective extrusion nozzles 126 and 128 and thereupon ejected under software control from the nozzles onto the substrate 110, or onto the layers previously disposed on the substrate.

While an FDM printing technique has been described here for illustration purposes, the disclosure herein is not so limited, and any suitable 3-D printing technique may be employed in connection with the description that follows.

Figure 2:
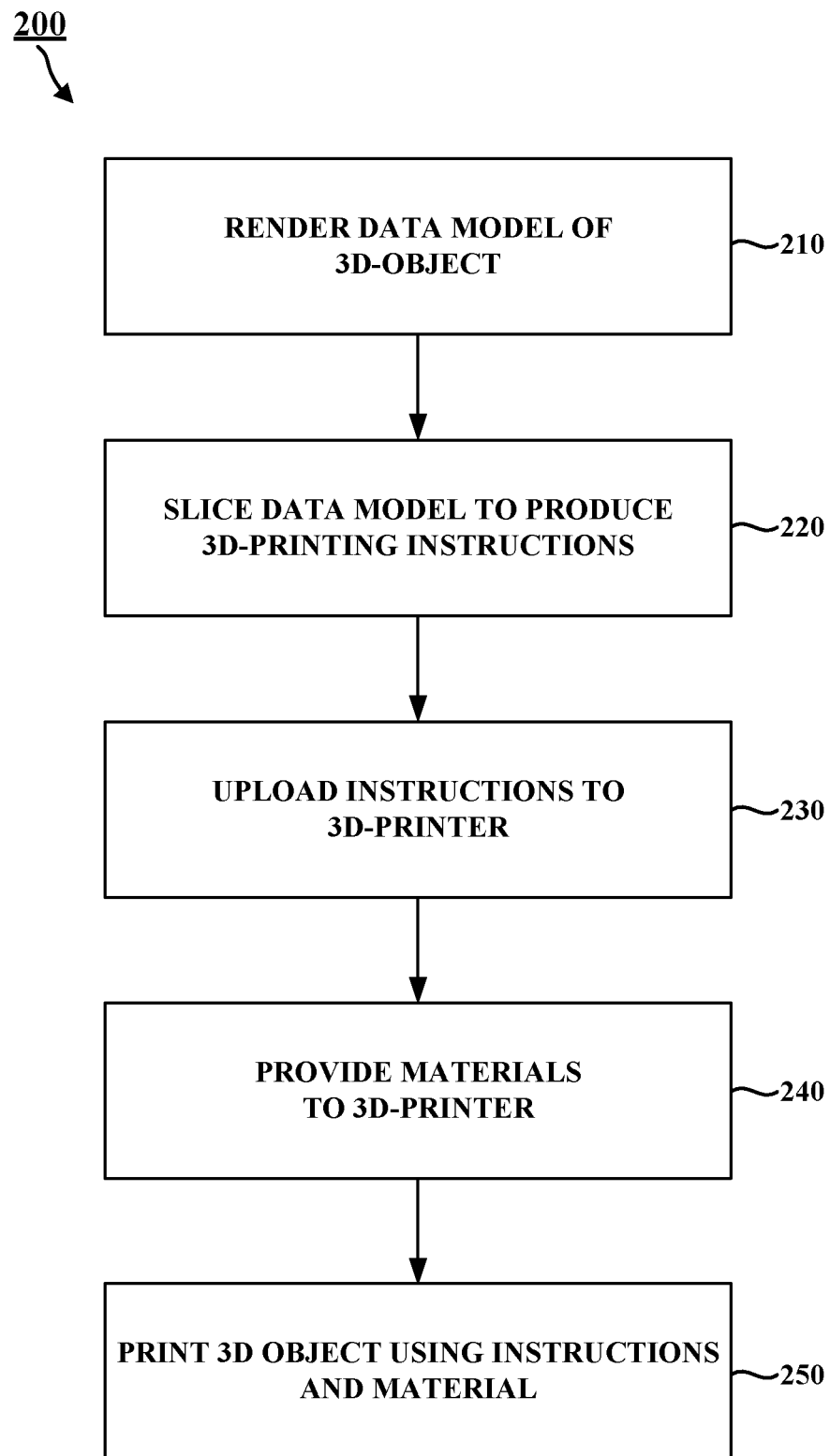
FIG. 2 is a flow diagram illustrating an exemplary process of 3-D printing.

FIG. 2 is a flow diagram 200 illustrating an exemplary process of 3-D printing. A data model of the desired 3-D object to be printed is rendered (step 210). A data model is a virtual design of the 3-D object. Thus, the data model may reflect the geometrical and structural features of the 3-D object, as well as its material composition. The data model may be created using a variety of methods, including 3-D scanning, 3-D modeling software, photogrammetry software, and camera imaging.

3-D scanning methods for creating the data model may also use a variety of techniques for generating a 3-D model. These techniques may include, for example, time-of-flight, volumetric scanning, structured light, modulated light, laser scanning, triangulation, and the like.

3-D modeling software, in turn, may include one of numerous commercially available 3-D modeling software applications. Data models may be rendered using a suitable computer-aided design (CAD) package, for example in an STL format. STL files are one example of a file format associated with commercially available CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 220). Numerous slicer programs are commercially available. Generally, the slicer program converts the data model into a series of individual layers representing thin slices (e.g., 100 microns thick) of the object being printed, along with a file containing the printer-specific instructions for 3-D printing these successive individual layers to produce an actual 3-D printed representation of the data model.

A common type of file used for this purpose is a G-code file, which is a numerical control programming language that includes instructions for 3-D printing the object. The G-code file, or other file constituting the instructions, is uploaded to the 3-D printer (step 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 240). In fused deposition modeling (FDM) 3-D printers, as indicated above, materials may be loaded as filaments on spools, which are placed on one or more spool holders. The filaments are typically fed into an extruder apparatus which, in operation, heats the filament into a melted form before ejecting the material onto a build plate or other substrate. In selective laser sintering (SLS) printing and other methods, the materials may be loaded as powders into chambers that feed the powder to a build platform. Depending on the 3-D printer, other techniques for loading printing materials may be used.

The respective data slices of the 3-D object are then printed based on the provided instructions using the material(s) (step 250). In 3-D printers that use laser sintering, a laser scans a powder bed and melts the powder together where structure is desired and avoids scanning areas where the sliced data indicates that nothing is to be printed. This process may be repeated thousands of times until the desired structure is formed, after which the printed part is removed from a fabricator. In fused deposition modeling, as described above, parts are printed by applying successive layers of model and support materials to a substrate. In general, any suitable 3-D printing technology may be employed for purposes of this disclosure.

Like other 3-D printing techniques, the FDM technique has a minimum layer resolution, which may in some configurations be on the order of 0.127 mm or thereabouts, depending on the printer resolution and other factors. As a consequence of this minimum resolution, it becomes apparent that the attempted 3-D printing of an angled surface will result in often unwanted "stair-stepped" artifacts caused by the finite thickness of the successive layers.

Conventional spray forming involves manufacturing metal components with homogeneous microstructures via the inert gas atomization of a liquid metal stream into droplets and the deposition of semi-solid sprayed droplets onto a shaped substrate. The substrate collects the droplets and solidifies them into a coherent preform. In one example of the process, an alloy is melted, normally in an induction furnace, then the molten metal is slowly poured through a conical tundish into a small-bore ceramic nozzle. The molten metal exits the furnace and is broken up into droplets by an atomizer. The droplets then proceed downwards to impact a substrate. The process is arranged such that the droplets strike the substrate while in the semi-solid condition. This process provides sufficient liquid fraction to 'stick' the solid fraction together. Deposition continues, gradually building up a spray formed part, such as a billet, of metal on the substrate. Spray forming may use a chamber in the shape of the part to be manufactured.

Spray forming may involve applying finishing procedures on metal structures as indicated above or forming metal structures in a chamber. More specifically, metal parts may be spray formed in a temperature controlled chamber, which is typically in a shape that is consistent with that of the final part. In current metal spray forming processes, dedicated equipment is needed such as the chamber, nozzle, atomizer, etc. In addition, the metal parts are limited by the constraints of the chamber and can only be shaped to substantially adhere to the geometry of the chamber.

Accordingly, in one embodiment, a spray forming technique is incorporated as part of a 3-D printer. The 3-D printer includes a flexible, computer-controlled nozzle having six degrees of freedom that is capable of being manipulated in all three X-Y-Z directions and inclined at a variety of angles relative to the printer build plate. The 3-D printer incorporating the spray former may, depending on the embodiment, be used for both for finishing of surfaces of existing parts and for wholesale construction of parts. In other exemplary embodiments, the spray forming 3-D printer is not limited to spray forming of metals and may additionally or alternatively employ spray forming of plastics and other materials, e.g., metal. Thus, the 3-D printer may incorporate a spray former that broadly includes one or more mechanical assemblies for converting a desired material into droplets and spray forming the material in a manner specified by the 3-D printing instructions and/or the CAM program associated with the 3-D printer.

Figure 3:
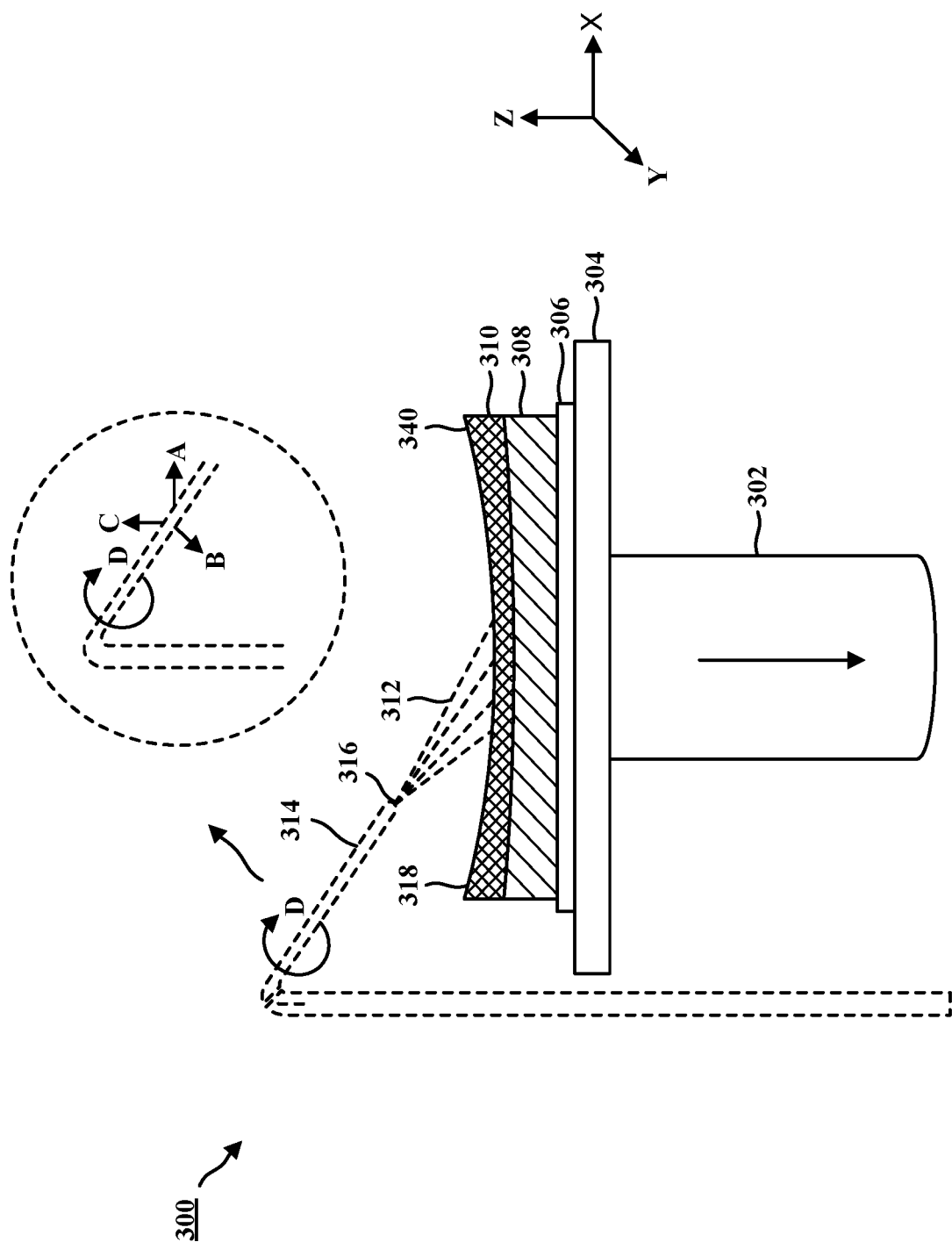
FIG. 3 is a diagram of a 3-D printer employing spray forming.

FIG. 3 shows a conceptual diagram of a 3-D printer 300 employing spray forming. The 3-D printer includes support arm 302, build plate 304, and substrate 306. In this embodiment, a tooling shell 308 is disposed on a surface of substrate 306. In one exemplary embodiment, the tooling shell 308 was previously machined, or 3-D printed and was placed on the substrate 308 after its construction.

In another exemplary embodiment as described further below with reference to FIG. 4, the tooling shell 308 may be 3-D printed on 3-D printer 300. For example, 3-D printer 300 may include a conventional computer-controlled print extruder (not shown) which may 3-D print the mold using any of a variety of known methods (SLS, FDM, etc.). In another exemplary embodiment, the mold is spray formed using 3-D printer 300.

A robotic arm 314 under computer control of the 3-D printer may be used to spray form a part 310, such as a panel, on a surface of the tooling shell 308. In other exemplary embodiments, the spray forming is deposited directly on substrate 306 to spray form the part 310. The nozzle 316 of the robotic arm 314 shoots droplets 312 of material onto the tooling shell 308 to thereby create the part 310 as described above.

As the part 310 is formed by the 3-D printer using spray forming, it will be appreciated that the angled or inclined sections 318 and 320 of part 310 can be created without any appreciable stair-stepped effect. Accordingly, the use of spray forming as part of, and under computer control of, the 3-D printer enables a manufacturer to form a part 310 that requires no further finishing step. Accordingly, a smoothened part may be provided in a single step or on a single 3-D printer.

In an exemplary embodiment, robotic arm 314 can be manipulated in a variety of directions and angles. For example, robotic arm 314 may be moved in one or more of the A, B or C directions (or directions at any point in between), which may correspond respectively to coordinate axes X, Y, Z of the 3-D printer. For example, in another exemplary embodiment, robotic arm 314 can be inclined at substantially any angle in order to perform spray forming at a variety of angles. In yet another embodiment, robotic arm 314 may be configured to rotate or twist as shown by the arrow and corresponding designation D. In an exemplary embodiment, the robotic arm 314 is equipped with six degrees of freedom. In one embodiment, the robotic arm 314 is designed to be thin relative to the generally bulky print extruder 402 (see FIG. 4) and associated mechanical assembly. This gives the robotic arm 314 additional flexibility to move about the substrate.

Conventional 3-D printers that perform plastic extrusion generally have a limited ability to alter angles of the print extruder. Such conventional printers typically employ a pivot point for the print nozzle in lieu of a thin, flexible robotic arm. For this reason, the extruders on 3-D printers typically do not have the six degrees of freedom such that they can have significant flexibility in their degrees of movement. One reason for this limitation is that conventional print nozzles typically have thicker diameters and cannot be manipulated easily about different axes, in contrast to the sleek robotic arm 314, whose range of diameters may be made very thin due in part to the intrinsic nature of the spray forming technique and the small size of droplets required from the spray nozzle.

In addition, due to the thickness of the extruded material and other constraints, material extruded from conventional printers may be adversely affected by gravity when the extruder angle is changed, for example, to a slightly angled position to deposit material. That is, the print extruder in the conventional 3-D printer is often bulky, carries more inertia, and is limited in motion due to its pivot point connection to the remainder of the extrusion system so that its flexibility to change angles and directions are accordingly limited. This phenomenon is similar in principle to attempting to write upside down with a ballpoint pen. 3-D printing using spray forming lacks this limitation. The spray forming technologies enables the 3-D printer to spray the light droplets on the substrate or part at essentially any angle, including in an upward direction, and the spray mechanic is not substantially adversely affected by gravity.

Because the robotic arm 314 and spray forming capability is incorporated as part of the 3-D printer, the arm 314 can be controlled and directed under computer control using instructions provided directly to the 3-D printer. In addition, in contrast to the conventional spray forming method wherein a chamber constrains the part formation to adhere to a single or a limited geometry, the 3-D printer as disclosed herein can spray form parts in three dimensions, with such parts having a variety of possible geometries and features under software control.

The mechanical assembly of the robotic arm 314 and printer may vary depending on the embodiment. Where spray forming of metals is performed, the assembly may incorporate a mechanism for heating the metal, an atomizer, and other elements. In another embodiment, robotic arm 314 of the 3-D printer may be configured to spray resins onto a mold or a substrate for forming or finishing parts. Generally, in considering the spray forming of different types of materials, molten materials should not be overly viscous to thereby render them too difficult for nozzle 316 to eject the droplets. Accordingly, in an exemplary embodiment, nozzle 316 of robotic arm 314 may include an assembly for adjusting the viscosity of the target material to be used in the spray forming process. In one embodiment, the assembly may be dynamically adjusted according to software as a function of the material to be used in the spray forming process. In addition, for plastics, a heating mechanism may be included in or proximate to nozzle 316 for facilitating the flow of the material.

Where thermoset resins are used, the resin and the hardener are generally mixed in some ratio and then applied. Pre-mixing the resin and the hardener and then attempting to spray form the resulting viscous material gives rise to inherent difficulties. For example, pre-mixing the resin and hardener and spray forming the combined material may cause the material to cure within the nozzle, thereby clogging the nozzle.

Accordingly, in another exemplary embodiment, robotic arm 314 may include two nozzles 316 (only one shown), each of which constitutes a separate spray forming head. A first such nozzle may spray the resin and the second nozzle may spray the hardener. This technique obviates the difficulties inherent in pre-mixing and spraying the combined resin and hardener.

The above-described 3-D printing techniques can be used either to smooth (finish) a part such as a panel using spray forming or to create a part.

In spray forming plastics, the diameter of the nozzle 316 is generally very small, in some embodiments being on the order of approximately 50 µm. Because the diameter of nozzle 316 is small, the corresponding thickness of the material exiting nozzle 316 may be negligible, such that substantially no stair-stepped effect is observed when 3-D printing parts using the spray forming technique.

The robotic arm 314 is advantageous for incorporation into the 3-D printer 300 for use in spray forming because, among other reasons, such robotic assemblies may be controlled by a data model and related instructions as are used in 3-D printers.

Referring back to FIG. 3, in an example where the part 310 to be formed constitutes an exterior body panel of a vehicle, the material forming the panel can be sprayed over the 3-D printed tooling shell 308 (or the substrate 306 in other embodiments). In this manner, imperfections that arise due to surface properties of the 3-D printed tooling shell 308 are present only on the B side of the final panel where the part 310 meets the surface of tooling shell 308. In contrast, the A side (surface 318, 320 of part 310) of the panel may be made to be substantially flawlessly smooth, thereby satisfying Class A vehicular surface requirements.

In another exemplary embodiment, the 3-D printer as described above can be used to spray resin on metal or plastic 3-D printed tools to smoothen the surface of the tools.

In the embodiments involving spray forming of metals, various techniques and processes may be suitable for use in conjunction therewith including plasma deposition, physical vapor deposition, chemical vapor deposition, and the like.

Figure 4:
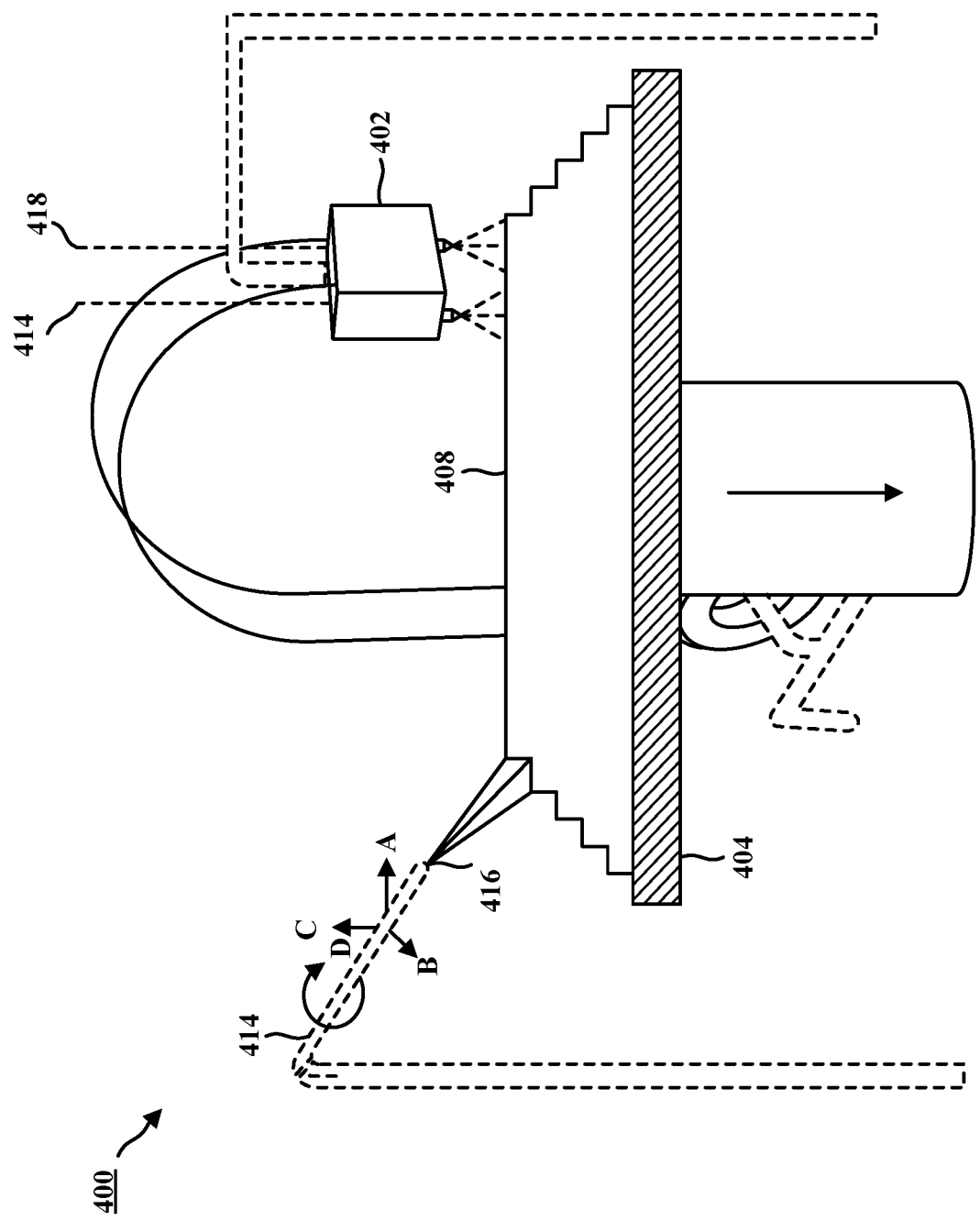
FIG. 4 is a diagram of a 3-D printer integrating spray forming and fused deposition modeling (FDM) printing.

FIG. 4 shows a diagram of a 3-D printer 400 integrating spray forming and FDM printing capability. While an FDM assembly is shown for purposes of illustration, it will be appreciated that any conventional 3-D printing technique may be integrated with the spray forming mechanism. The spray forming mechanism includes robotic arm 414, nozzle 416, and associated control mechanism (not shown) guided by printer software. As previously shown with reference to FIG. 3, robotic arm 414 of FIG. 4 may be under control of the 3-D printer instructions and can be manipulated at a variety of angles and directions, including in the A, B, C, and D directions.

In the embodiment shown, part 408 is 3-D printed on build plate 404 (or an intervening substrate or foam base) using print extruder 402 and one or both of print materials 414 and 418. As discussed in connection with previous embodiments, the angled portions of part 408 are characterized by a stair-stepped effect, the scale of which is exaggerated here for clarity. After part 408 is 3-D printed via print extruder 402, nozzle 416 of robotic arm applies spray forming to finish the part and thereby reduce or eliminate the stair-stepped effect, such that part 408 will have smooth angled surfaces. Depending on the embodiment, metals, plastics, or composites may be spray formed.

Figure 5:
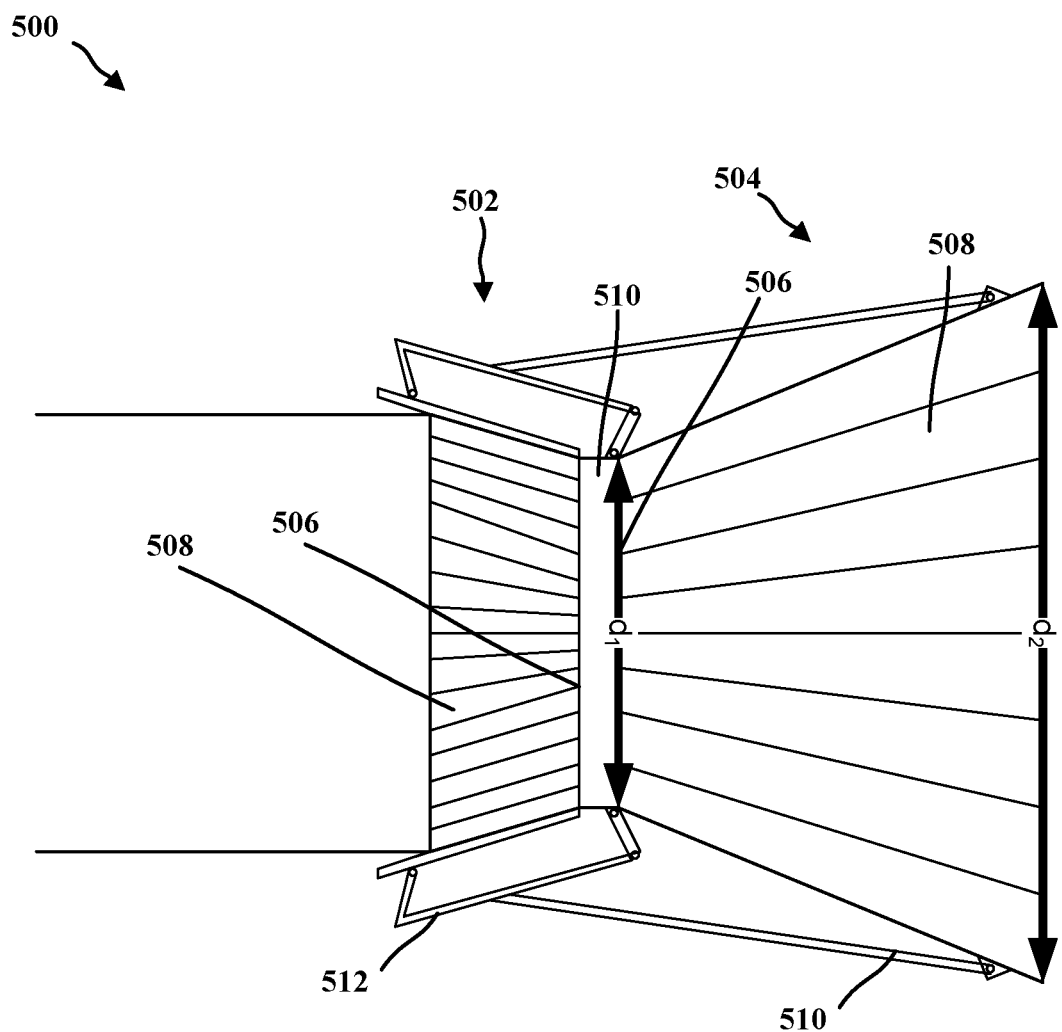
FIG. 5 is a diagram of a cold-spray nozzle that may be used in conjunction with a 3-D printer employing spray forming such as the 3-D printer employing spray forming illustrated with respect to FIGS. 3-4.

FIG. 5 is a diagram of a cold-spray nozzle 500 that may be used in conjunction with a 3-D printer (e.g., 300, 400) employing spray forming such as the 3-D printer (e.g., 300, 400) employing spray forming illustrated with respect to FIGS. 3-4.

An aspect of the systems and methods described herein presents a technique that may enable print resolution control. The print resolution control may be mid-print, e.g., the resolution may be changed during the course of printing a particular item, e.g., using the 3-D printer (e.g., 300, 400). The print resolution control may be used for cold-spray additive manufacturing. For example, the systems and methods described herein may include a cold-spray nozzle 500 with a variable diameter convergent part 502 and a variable diameter divergent part 504 forming a diffuser (e.g., variable diameter divergent part 504).

For example, one aspect may include a series of hinges 506 and overlapping sheets 508 to control the diameter ($d_1$) of the converging section (e.g., variable diameter convergent part 502) and the diameter ($d_2$) of the diverging sections (e.g., variable diameter divergent part 504) of a cold-spray gun (cold-spray nozzle 500). In an aspect, the resolution of metal deposited depends on a resulting particle flow. The resulting particle flow may depend strongly on the choke point 510 and outlet diameter ($d_2$). By varying both the choke point 510 and outlet diameter ($d_2$), it is possible to change, mid-print, the resulting area of deposition, e.g., by an order of magnitude. Previous cold-spray guns have machined converging-diverging nozzles and require switching the physical nozzle to change the deposition area.

In an aspect, a cold-spray nozzle 500 includes a variable diameter convergent part 502. Additionally, the cold-spray nozzle 500 includes a variable diameter divergent part 504 forming a diffuser. The cold-spray nozzle 500 also includes a ring portion 510 coupling the variable diameter convergent part 502 and the variable diameter divergent part 504. The ring portion 510 controls the opening to the diffuser, e.g., the variable diameter divergent part 504.

In an aspect, the variable diameter convergent part 502 comprises a nozzle 500 containing a series of hinges 506 and overlapping sheets 508 within the nozzle 500, the hinges 506 and overlapping sheets 508 configured to control the diameter ($d_1$) of the variable diameter convergent part 502.

In an aspect, the variable diameter divergent part 504 comprises a nozzle containing a series of hinges 506 and overlapping sheets 508 within the nozzle, the hinges 506 and overlapping sheets 508 configured to control the diameter ($d_2$) of the variable diameter divergent part 504.

In an aspect, the size of the ring portion 510 is variable. The size of the ring portion 510 controls a flow of a cold-spray.

Figure 6:
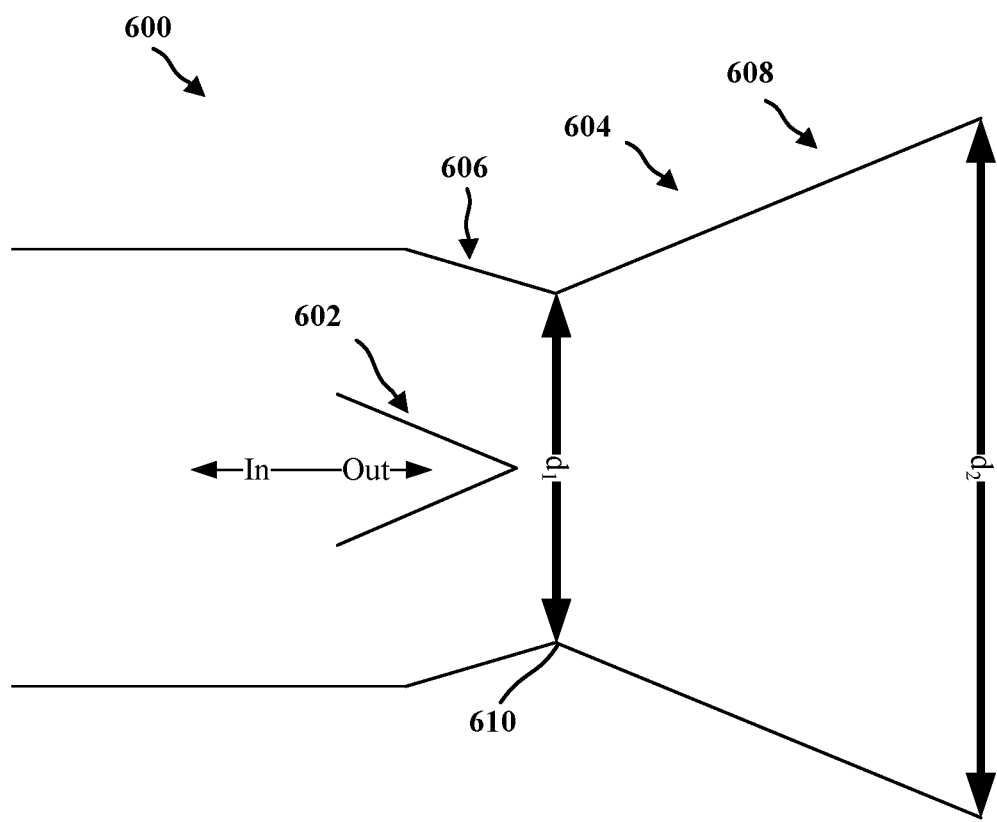
FIG. 6 is a diagram of a cold-spray nozzle that may be used in conjunction with a 3-D printer employing spray forming such as the 3-D printer employing spray forming illustrated with respect to FIGS. 3-4.

FIG. 6 is another diagram of a cold-spray nozzle 600 that may be used in conjunction with a 3-D printer (e.g., 300, 400) employing spray forming such as the 3-D printer (e.g., 300, 400) employing spray forming illustrated with respect to FIGS. 3-4.

As discussed above, an aspect of the systems and methods described herein presents a technique that may enable print resolution control. The print resolution control may be mid-print, e.g., resolution may be changed during the course of printing a particular item, e.g., using the 3-D printer (e.g., 300, 400). The print resolution control may be used for cold-spray additive manufacturing. For example, the systems and methods described herein may include a cold-spray nozzle 600 with a variable diameter divergent part that includes a plug nozzle.

For example, one aspect may include a plug nozzle 602 inside the cold-spray nozzle 600 to control the usable diameter where the converging section 606 and the divergent section 608 meet. The choke point 610 has a diameter, $d_1$. The portion of the choke point 610 that is actually available for a flow of cold-spray material out of the cold-spray nozzle 600 may be adjusted using the plug nozzle 602. For example, as the plug nozzle 602 moves in and out within the cold-spray nozzle 600, the, usable portion allowing material flow enlarges or decreases within a choke point 610. The outer diameter of the choke point 610 may remain a diameter, $d_1$. More specifically, As the plug nozzle 602 moves out, the usable portion of the choke point 610 having the diameter ($d_1$) increases. As the plug nozzle 602 moves in, the usable portion of the choke point 610 having the diameter ($d_1$) decreases.

As discussed above, in an aspect, the resolution of metal deposited depends on a resulting particle flow. The resulting particle flow may depend strongly on the portion of the choke point 610 available for material flow. While the diameter ($d_1$) and the outlet diameter ($d_2$) may be fixed, flow through the choke point may be adjusted by moving the plug nozzle 602. By varying the position of the plug nozzle 602, it may be possible to change, mid-print, the resulting area of deposition, e.g., by an order of magnitude.

In an aspect, a cold-spray nozzle 600 includes a variable usable diameter convergent part 606. Referring back to FIGS. 1A-1B, 3, and 4, a cold-spray device (100, 300, 400) may include a material hopper (or spool 104). The cold-spray device (100, 300, 400) may also include a pressurized gas feed (not shown) coupled to the material hopper. Additionally, the cold-spray device (100, 300, 400) may include a cold-spray nozzle (126, 128, 316, 416, 500, 600) coupled to the pressurized gas feed and configured to receive material from the material hopper. The cold-spray nozzle (126, 128, 316, 416, 500, 600) may include a variable diameter convergent part (502, 606), a variable diameter divergent part (504, 604) forming a diffuser, and a ring portion (510) coupling the variable diameter convergent part (502, 606) and the variable diameter divergent part (504, 604) and controlling the opening to the diffuser, e.g., variable diameter divergent part (504, 608).

Figure 7:
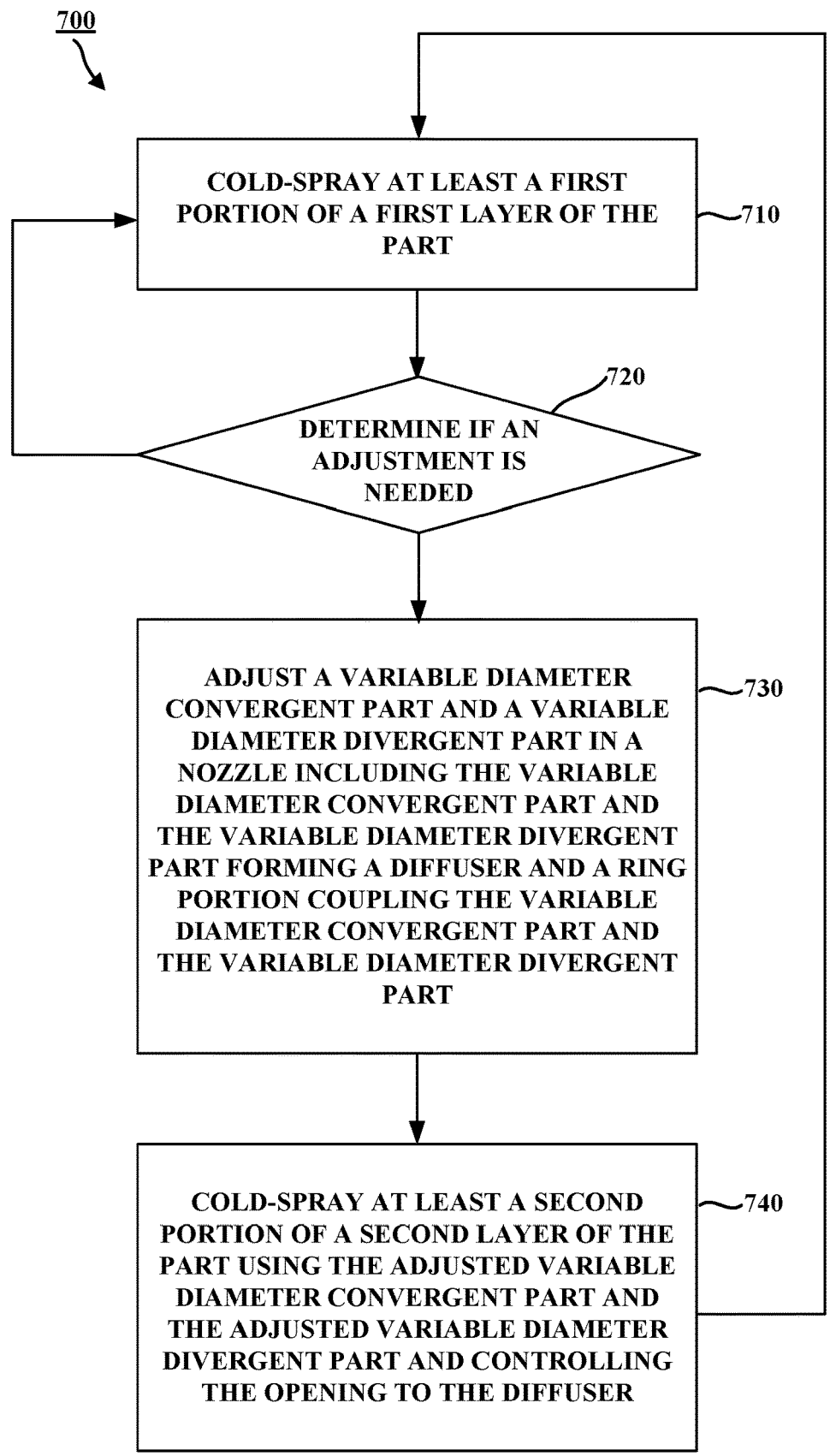
FIG. 7 is a flow diagram illustrating an exemplary method of cold-spray forming a part.

FIG. 7 is a flow diagram illustrating an exemplary method of cold-spray forming a part. At 710, cold-spray at least a first portion of a first layer of the part. For example, cold-spray (e.g., using a cold-spray nozzle 126, 128, 316, 416, 500, 600 on a cold-spray device 100, 300, 400) at least a first portion of a first layer of the part. In an aspect, the first layer and the second layer may be different layers. In another aspect, the first layer and the second layer may be a same layer.

At 720, a determination is made if an adjustment of a variable diameter convergent part and a variable diameter divergent part in a nozzle is needed. The nozzle includes the variable diameter convergent part. For example, a processing system on a cold-spray device (100, 300, 400) or connected to a cold-spray device (100, 300, 400) may determine if an adjustment of a variable diameter convergent part (502, 606) and a variable diameter divergent part (504) is needed. The nozzle (126, 128, 316, 416, 500, 600) includes the variable diameter convergent part (502, 606) is needed.

In an aspect, the adjusting occurs continuously over the same layer. In other words, the adjusting may be without interruption or without gaps, e.g., over a particular interval when spray-forming is occurring. In another aspect, the adjusting occurs continually over the same layer. In other words, the adjusting may frequently be repeated in the same way, or regularly, e.g., over a particular interval when spray-forming is occurring. For example, when an adjustment is needed, the method may proceed to block 730 (below). When an adjustment is not needed, the method may continue cold-spraying, e.g., return to block 710, e.g., over a particular interval when spray-forming is occurring. Alternatively, the cold-spray may end (not shown), e.g., when a part is completed, a device implementing the method needs adjustment, fixing, replenishment of materials, or some other change, alteration, modification, adjustment, variation, or adaptation.

At 730, a variable diameter convergent part and a variable diameter divergent part in a nozzle are adjusted. The nozzle may include the variable diameter convergent part and the variable diameter divergent part. The variable diameter divergent part forms a diffuser. A ring portion couples the variable diameter convergent part and the variable diameter divergent part. For example, a processing system on or connected to a cold-spray device 100, 300, 400 may control a nozzle (126, 128, 316, 416, 500, 600) such that the nozzle (126, 128, 316, 416, 500, 600) is adjusted. The nozzle (126, 128, 316, 416, 500, 600) may include a variable diameter convergent part (502, 606) and a variable diameter divergent part (504) in a nozzle (126, 128, 316, 416, 500, 600) including the variable diameter convergent part (502, 606). The variable diameter divergent part (504) forms a diffuser. A ring portion (510) couples the variable diameter convergent (502, 606) part and the variable diameter divergent part (504). In an aspect, a convergent part (606) may vary using a plug nozzle (602).

At 740, at least a second portion of a second layer of the part is cold-sprayed using the adjusted variable diameter convergent part and the adjusted variable diameter divergent part. For example, a cold-spray device 100, 300, 400 may cold-spray at least a second portion of a second layer of the part using the adjusted variable diameter convergent part (502, 606) and the adjusted variable diameter divergent part (504). After the block 740, the method may repeat with subsequent first layers and the first portion or a subsequent "first" portion. In other words, a subsequent execution of block 710 may follow block 714. Alternatively, the method may end after execution of block 740 (not shown).

The previous description is provided to enable any person skilled in the art to practice the various aspects described herein. Various modifications to these exemplary embodiments presented throughout this disclosure will be readily apparent to those skilled in the art, and the concepts disclosed herein may be applied to 3-D printing techniques using spray forming. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A cold-spray device comprising:
    a material hopper;
    a pressurized gas feed coupled to the material hopper; and
    a cold-spray nozzle coupled to the pressurized gas feed and configured to receive material from the material hopper, the cold-spray nozzle including:
        a variable diameter convergent part;
        a variable diameter divergent part forming a diffuser; and
        a ring portion coupling the variable diameter convergent part and the variable diameter divergent part, wherein a size of the ring portion controls a flow of a cold-spray through an opening between the variable diameter convergent part and the variable diameter divergent part;
    wherein the nozzle contains a series of hinges and overlapping sheets within the nozzle, the hinges and overlapping sheets configured to control a diameter of the variable diameter divergent part.

2. The cold-spray device of claim 1, wherein the variable diameter convergent part comprises a nozzle.

3. The cold-spray device of claim 1, further comprising a movable build platform.

\* \* \* \* \*